US005924660A

United States Patent [19]
Marron

[11] Patent Number: 5,924,660

[45] Date of Patent: Jul. 20, 1999

[54] LOAD HANDLING EQUIPMENT

[76] Inventor: Kevin Francis Marron, 21 Highland Avenue, Rostrevor, South Australia 5073, Australia

[21] Appl. No.: 08/862,666

[22] Filed: May 23, 1997

[51] Int. Cl.[6] .................................................... F16M 11/24

[52] U.S. Cl. ........................ 248/165; 248/163.1; 248/166

[58] Field of Search ................................ 248/161, 163.1, 248/165, 176.1, 177.1, 440, 188.6, 166; 182/181.1, 185.1, 186.3, 186.5; 472/118

[56] References Cited

U.S. PATENT DOCUMENTS

| | | | |
|---|---|---|---|
| 342,153 | 5/1886 | Whitcomb | 248/166 |
| 488,349 | 12/1892 | Bradley | 248/165 |
| 631,602 | 8/1899 | Wood et al. | 248/166 |
| 638,987 | 12/1899 | Porten | 248/166 |
| 714,554 | 11/1902 | Augustus | 248/165 |
| 932,702 | 8/1909 | Harris | 248/166 |
| 1,147,668 | 7/1915 | Anderson | 248/165 |
| 1,408,675 | 3/1922 | Wimberg | 248/163.1 |
| 2,965,305 | 12/1960 | Glazer et al. | 248/163.1 |
| 3,610,224 | 10/1971 | Marshall | 248/188.6 |
| 4,256,300 | 3/1981 | Boucher | 248/165 |

*Primary Examiner*—Ramon O. Ramirez
*Assistant Examiner*—Robert Lipcsik
*Attorney, Agent, or Firm*—Watts, Hoffman, Fisher & Heinke Co., L.P.A.

[57] ABSTRACT

Load handling equipment (10) has a longitudinally extending beam (11) supported by four legs (12, 13) each of which is joined to the beam by insertion into a sleeve (14), and there is a fifth sleeve (35) at one end which is hinged with respect to the beam (11), the arrangement being such that, upon erection of the equipment, the upper ends of the legs (12) of one of the pairs of legs may be inserted into sleeves (14) at one end of the beam (11), a third of the legs (13) being inserted into the fifth sleeve (35) at the other end of the beam (11) and being utilized to elevate that other end of the beam while the fourth leg (13) is inserted, the third leg (13) then being transferred from the fifth sleeve (35) to the third sleeve (14) so that the beam is then supported by two legs at one end and one leg at the other, and when in that position, the fourth leg being inserted into one of the fixed sleeves at the fifth component end of the beam, whereupon the fifth component can be hinged out again, the leg which has temporarily supported the beam end can be removed from the fifth component sleeve, and its upper end can be reinserted into the remaining fixed sleeve at the fifth sleeve end of the beam.

27 Claims, 3 Drawing Sheets

LOAD HANDLING EQUIPMENT

This invention relates primarily to load handling equipment which can be used in cooperation with lifting heavy articles, but it also extends to equipment which can be utilised in bench manner for work piece clamping means, for example a vice, and still further, the invention relates in one of its aspects to a method of erecting the equipment, which can also be of height greater than the height of a person.

BACKGROUND OF THE INVENTION

Quite often there is need for on site equipment which can be used for lifting heavy articles, for example lifting an engine from a vehicle, but such equipment necessarily occupies a large volume, and for transport purposes needs to be easily demounted or knocked down to a series of components, and readily re-erected. Accordingly, one of the objects of this invention is to provide equipment which can be readily erected, and in particular, when so erected can be very safe so that accident hazard is reduced as far as is reasonably practicable.

BRIEF SUMMARY OF THE INVENTION

Thus in one aspect of the invention, load handling equipment comprises a longitudinally extending beam supported by four legs each of which is joined to the beam in a spigot and socket manner, and there is a fifth spigot and socket assembly at one end which is hinged with respect to the beam, the arrangement being such that, upon erection of the equipment from a knocked down state to an in-use state, the upper ends of the legs of one of the pairs of legs may be connected to a pair of sleeve components at one end of the beam, a third of the legs being connected to a fifth sleeve component at the other end of the beam and being utilized to elevate that other end of the beam so that the beam is then supported by two legs at one end and one leg at the other, and when in that position, the fourth leg being inserted into one of the fixed sleeves at the fifth component end of the beam, whereupon the fifth component can be hinged out again, the leg which has temporarily supported the beam end can be removed from the fifth component sleeve, and its upper end can be reinserted into the remaining fixed sleeve at the fifth sleeve end of the beam.

The beam can sometimes be used in fixed applications wherein a single location of, say a chain and sprocket assembly can be located. Alternatively, the beam may be of the type which carries a small trolley so that, for example a work load when lifted and supported by the beam can be moved along the beam away from its original position, for example for lifting an engine from a vehicle and transferring it from the vehicle to a trailer or a second vehicle. Thus the beam will usually be of tubular or I-beam shape, depending on the application to which it will be applied.

When erected, it is important that the structure should be reasonably stable to reduce the possibility of accident occurring, and in another aspect of the invention near the fifth component end of the beam there is a hinged strut which will hinge downwardly, assisting an operator when erecting that end of the beam after the other end has already been provided with its supporting legs, and the legs at the fifth component end of the beam are also supplied with a brace which can be clamped between them, the strut in use finally being secured to the centre of the brace, so that the brace defines with the upper ends of the legs a triangular structure, and the strut also defines the triangular structure with the other ends of the legs through the brace, the first triangular structure stiffening the beam against transverse movement, and the second triangular structure against longitudinal movement, thus imparting a high degree of rigidity.

For on site applications, there is frequently a requirement for a workbench, and workbenches also when fully erected are very bulky and inconvenient, and in another aspect of the invention a base plate can be attached at one end of the beam which is of size and shape to support a work piece clamping means, for example a vice, a pipe clamp or the like.

BRIEF DESCRIPTION OF THE DRAWINGS

While the invention need not necessarily include any specific combination of the abovementioned features, an embodiment is described hereunder in some detail with reference to and is illustrated in the accompanying drawings in which.

DETAILED DESCRIPTION OF THE PREFERRED EMBODIMENTS

Figure 2:
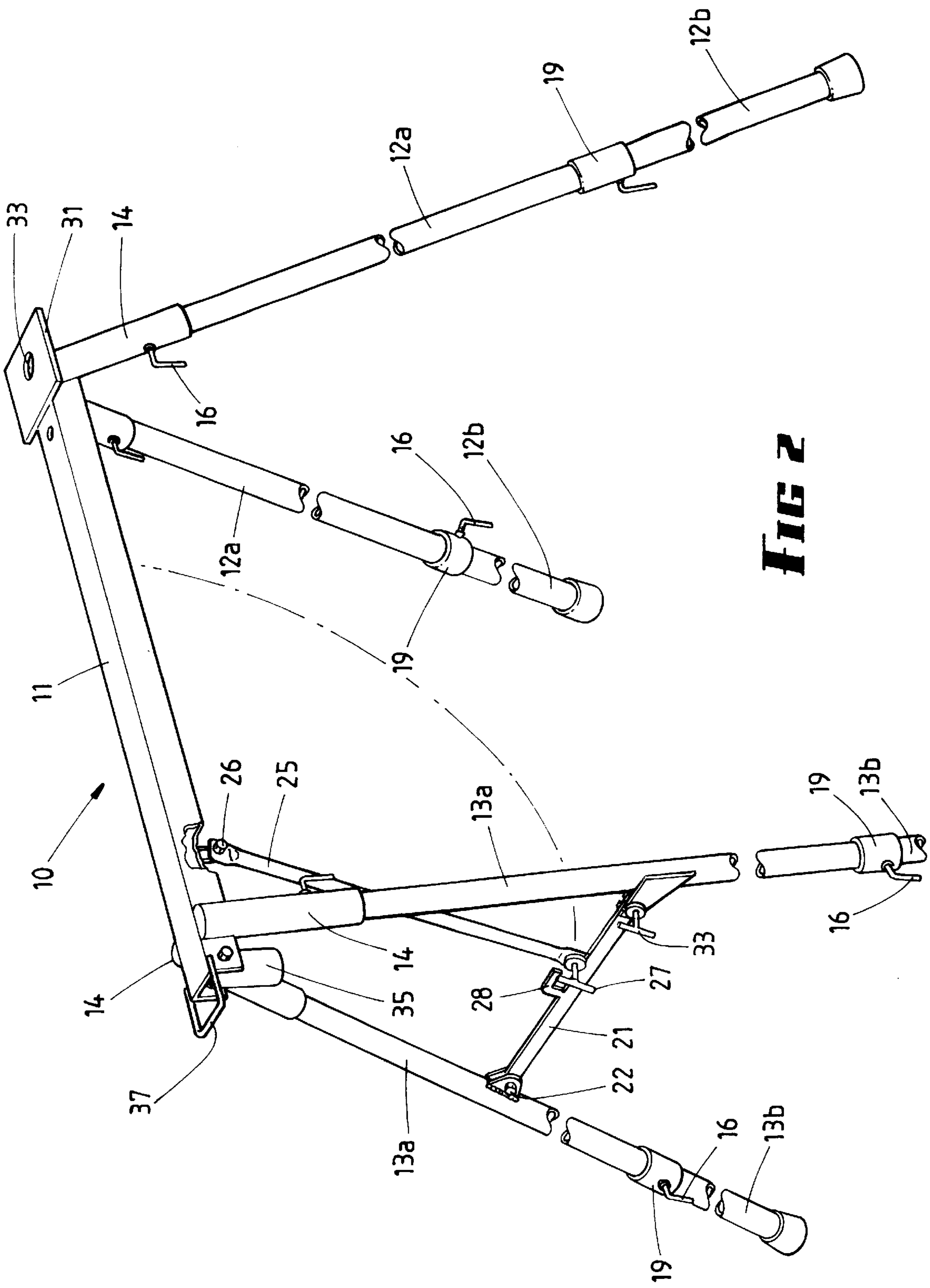
FIG. 2 is an isometric view illustrating features of the invention when the equipment is in its in use erected state.

Reference is first made in this description to FIG. 2 which illustrates most of the components. In FIG. 2 the load handling equipment comprises a trestle like structure 10 in its erected form, the structure having a horizontal beam 11 supported by two legs 12 at one end and another two legs 13 at the other end which is herein referred to as the "fifth sleeve end".

The beam 11 is illustrated as being of square tubular shape, and the legs 12 and 13 are of round tubular shape.

Figure 3:
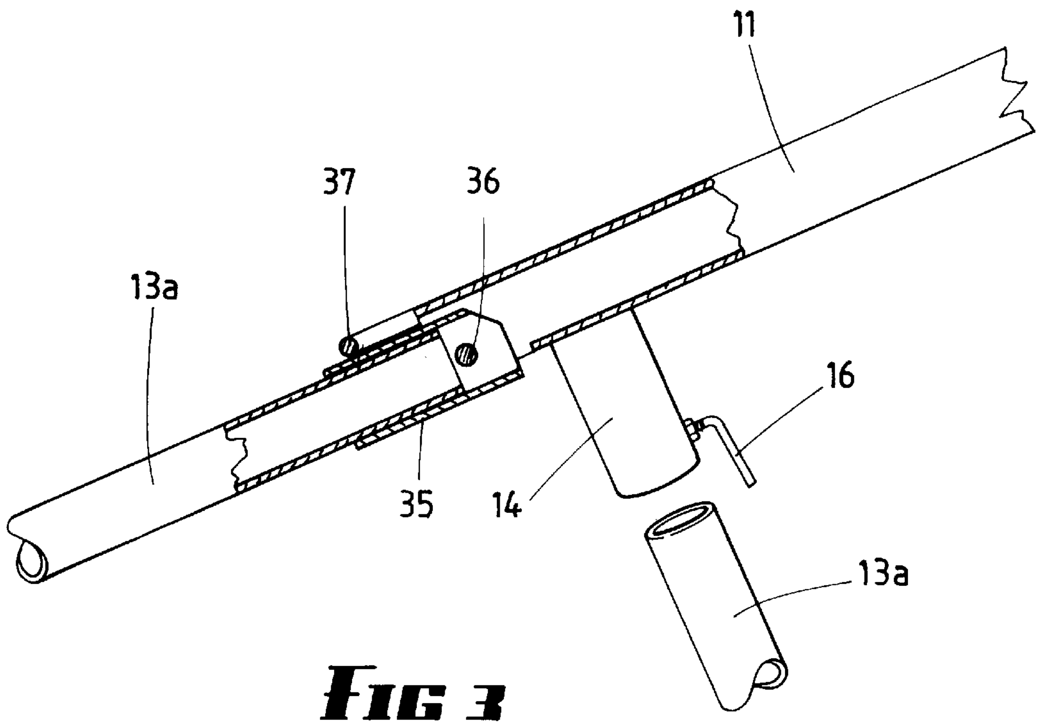
FIG. 3 is a fragmentary section showing the hinged fifth sleeve with a leg end therein, before the fifth sleeve end of the beam has been lifted by rotating the inserted leg about the hinge pin to a vertical position, FIG. 3 also showing a capped upper end of a leg before being inserted.

At each end, the beam 11 has a pair of rigid sleeve components 14 which are rigidly secured near the end of the beam and are splayed outwardly in a transverse direction, and each of the four legs 12 and 13 has its upper end firmly connected in a spigot and socket fashion into a respective sleeve 14, being clamped by screw threaded clamps 16 to inhibit danger of dislodgment. FIG. 3 shows the clamping arrangement drawn to a larger scale.

The legs 12 and 13 are shown to each comprise two portions marked 12*a* and 13*a* and 12*b* and 13*b*, and they too are interconnected by spigot and socket connections 19 which, if broken, will allow the height of the beam 11 to be lowered, in this embodiment, to a bench height, being supported by the legs 12*b* and 13*b*.

It is of utmost importance that the beam 11 should be as rigid as possible, and this is achieved partly by means firstly of a hinged brace 21 which is hinged to brackets 22 on one of the legs 13*a* and clamped by means of a clamping screw 33 to the other leg 13*a*, thereby defining with the upper parts of the legs 13*a* a triangular structure. That triangular structure inhibits at least that end of the load handling equipment against transverse movement, and longitudinal movement is similarly inhibited by a strut 25 which is hinged at its upper end 26 to the underside of the beam 11, and clamped at its lower end by a clamp 27 to a bracket 28 carried centrally in the hinge brace 21. The strut can be retracted as shown in dashed lines to lie along the lower face of beam 11.

Figure 4:
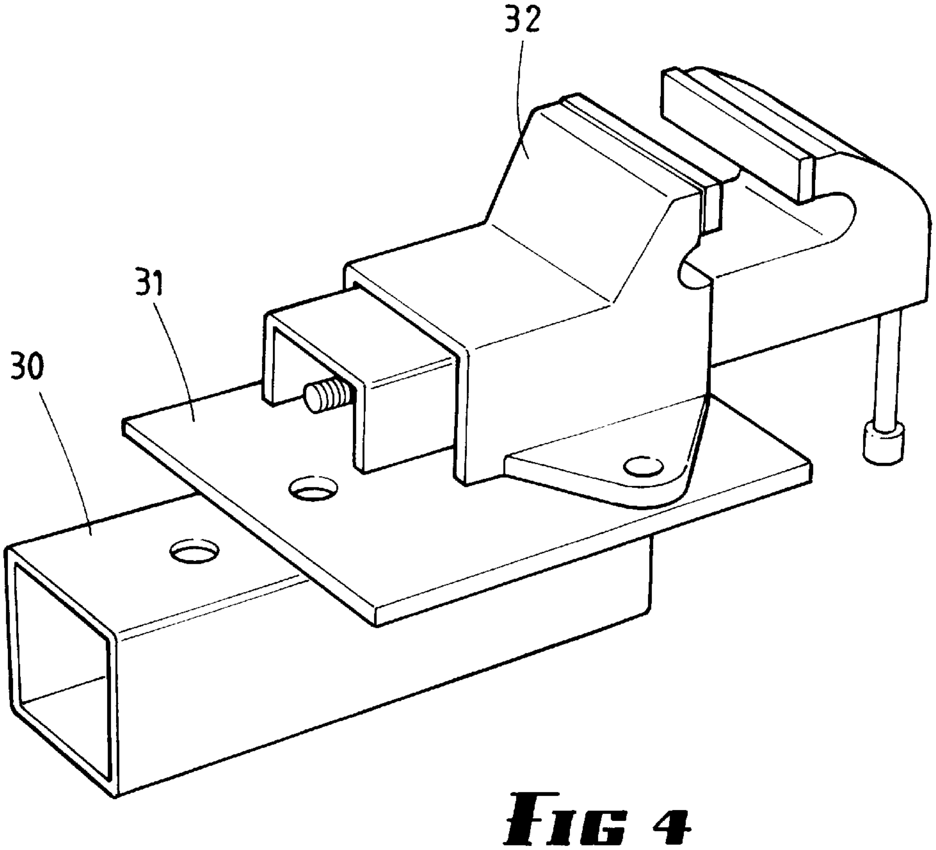
FIG. 4 illustrates how the base plate at the other end of the beam can support a clamp, in this instance the clamp being a vice.

There is also provided a mounting plate 31 at one end of insertable spigot 30 which slides into an end of beam 11, (the right hand end as shown), and that plate as shown in FIG. 4 can hold a clamping device, for example a vice 32, securing of the clamping device being effected by a nut and bolt assembly not shown, which extends through a single aperture 33 in the plate 31. Similarly spigot 30 can be secured in beam 11 by a screw threaded fastener (not shown).

FIGS. 2 and 3 illustrate the fifth sleeve 35 which is an important feature of this invention. The fifth sleeve 35 provides the socket portion of a spigot and socket connection of one of the legs 13 as shown best in FIG. 3, the fifth sleeve 35 hinging about a hinge bolt 36 so that the leg portion 13*a* can be moved from the position shown in FIG. 3 to a position which is more nearly vertical. An outwardly projecting handle 37 inhibits the leg portion 13*a* from any further rotation in a clockwise direction as shown in FIG. 3, and the inner wall of the projecting end of beam 11 limits the amount of anticlockwise movement. However, since the main function will be to lift the fifth sleeve end of the beam 11 from a sloping to an erect in use position which may be higher than the operator, the important function is that illustrated in FIG. 3 wherein the lifting of the leg 13*a* will assist in lifting the fifth sleeve end of the beam 11.

The invention is not limited to the means described above but also includes the method.

The method of erection is best seen in FIGS. 1*a* to 1*e*, the first stage being to insert the two legs 12 into the rigidly secured outwardly splayed sleeve components 14 at the end of beam 11 which carries the mounting plate 31.

Figure 1A:
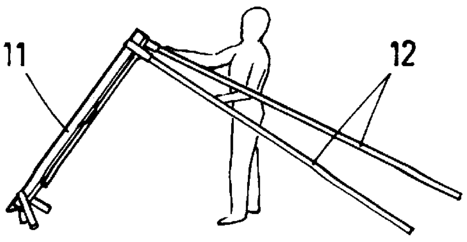
FIG. 1*a* shows the first stage of erection of the load handling equipment from a knocked down state to an in use state.
Figure 1B:
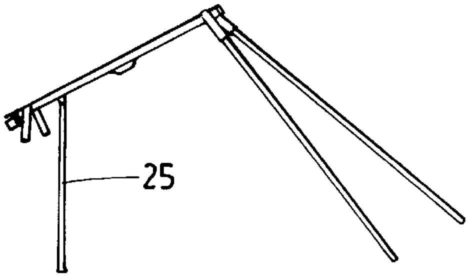
FIG. 1*b* shows the second stage of erection wherein the strut is used to support the fifth sleeve end of the beam.
Figure 1C:
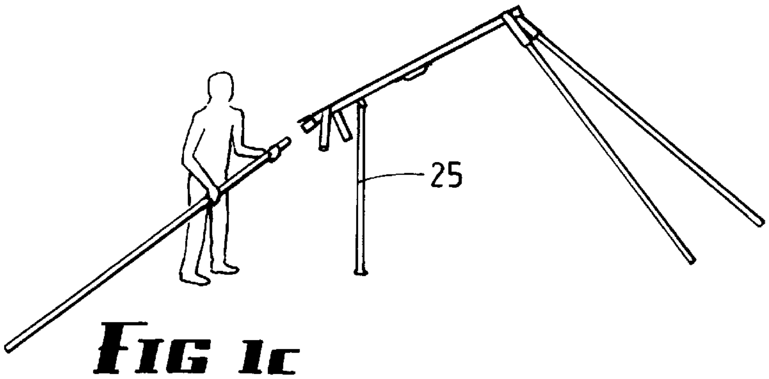
FIG. 1*c* shows the third stage of erection wherein one of the legs is inserted into the hinged fifth sleeve in a spigot and socket connection, and projects from the beam in a generally coaxial direction (although that direction can be varied considerably)
Figure 1D:
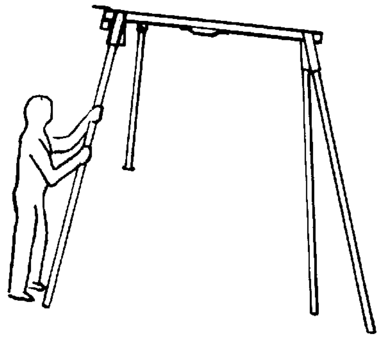
FIG. 1*d* shows a fourth stage wherein by moving the last mentioned leg and lifting it to be vertical, the fifth sleeve end of the beam is thereby lifted to be approximately horizontal and supported by three legs, thereby being stable.
Figure 1E:
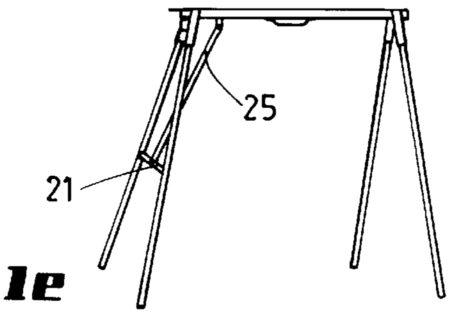
FIG. 1*e* shows the fifth sleeve end of the beam supported by one leg in one of the rigid sleeves at the fifth sleeve end, and the other leg in position in the other of the pair of rigid support sleeves, and also illustrates both the brace and strut in position.

This is easily achieved and as shown in FIG. 1*a* when that has been achieved, the fifth sleeve end of the beam 11 will rest upon the ground and the sleeve components 14 will be elevated. In that position, the strut 25 can be lowered and thereby used to lift the fifth sleeve end of beam 11 to a comfortable working height. At that height, the upper end of the third of the legs 13 can be inserted into the fifth sleeve 35 as shown in FIG. 3. In that position, the mechanical advantage achieved by the additional length imparted to the beam 11 makes it very easy for the beam 11 to be lifted further, to a horizontal position, and actually beyond the horizontal position if the leg 13 in sleeve 35 is made vertical. In that position therefore the other (fourth) leg 13 can be inserted in one of the rigid sleeves 14 and locked into position by its locking screw 16, and the upper end of the illustrated leg 13 in FIG. 3 can be removed from the sleeve 35. At that position the whole assembly will be supported as a tripod with one leg touching the ground at the fifth sleeve end of the beam and the other two legs touching the ground at the mounting plate end. The leg previously inserted in sleeve 35 can then be simply transferred to the fourth empty rigid sleeve 14 and locked into position, thereby providing the structure as illustrated in FIGS. 1*e* and 2.

When the structure is required for bench use, the lower portions 12*b* and 13*b* of the legs 12 and 13 are broken away from the upper portions at the locality of the sleeves 19, and the dimensions can be such that the mounting plate 31 provides a suitable height for work bench purposes, and beam 11 is useable as a horse.

The invention may be modified, or used in different configurations. In particular, the mounting plate can be used to support other clamps, for example, a log clamp, a hacksaw workpiece clamp, an angle iron clamp or a pipe clamp.

I claim:

1. A method of erection of load bearing equipment having a longitudinally extending beam, four rigid sleeves arranged in fixed positions in two pairs, one pair near each end of said beam, each of said rigid sleeves sloping downwardly and transversely outward of said beam when the equipment is in use, four legs each when in use, having an upper end engaged in an associated one of said rigid sleeves to thereby support said beam above a surface in an erected state when each of said four legs are in place, a fifth sleeve near one end of said beam, a hinge having a transverse axis hinging said fifth sleeve to said beam end, and stop means on said beam limiting upward hinging movement of said fifth sleeve and an engaged leg to substantial alignment with the longitudinal axis of said beam comprising the steps of:

a) inserting upper ends of first and second legs of said four legs into respective sleeves at another end of said beam to raise said another end of said beam above said surface while said one end rests on said surface, b) inserting an upper end of a third leg of said four legs into said fifth sleeve and rotating said third leg and said fifth sleeve together about said hinge to a vertical position to raise and temporarily support said one beam end above said surface to cooperate with said first and second legs to support said beam, c) inserting an upper end of a fourth leg of said four legs into one of the rigid sleeves near to the one end, and removing said third leg from said fifth sleeve, thereby supporting said beam with said first, second and fourth legs, and d) inserting an upper end of said third leg into the remaining sleeve to support said beam above said surface with said four legs.

2. A method according to claim 1 further comprising the step of:

e) fitting a brace member between said third and fourth legs intermediate their ends to form a substantially horizontal member to brace said legs: and f) securing a strut having one end hinged to said beam near said one end of the beam and another end of said strut having a fastening means being fastened to said brace member in a location intermediate the ends of said brace member.

3. A method of erection of load bearing equipment having a longitudinally extending beam, four rigid sleeves arranged in fixed positions in two pairs, one pair at each end of said beam, each of said four sleeves sloping downwardly and transversely outward of said beam when the equipment is in use, four legs having their upper ends engaged in said sleeves to thereby support said beam above a surface in an erected state when each of said four legs are in place, a fifth sleeve at one end of said beam sloping downwardly of said beam, a hinge having a transverse axis hinging said fifth sleeve to said beam end, and stop means on said beam limiting upward hinging movement of said fifth sleeve and an engaged leg to substantial alignment with the longitudinal axis of said beam, and a strut with a free end and its other end hinged to said beam near said one end of the beam, said method comprising the steps of:

a) inserting upper ends of first and second legs of said four legs into respective rigid sleeves at another end of said beam to raise said another end of said beam above said surface while said one end rests on said surface, b) locating said free end of strut on said surface to support said one end of the beam above said surface, c) inserting an upper end of a third leg of said four legs into said fifth sleeve and rotating said leg and said fifth sleeve together about said hinge to a vertical position to temporarily further raise and support one end above said surface to cooperate with said first and second legs to support said beam, d) inserting an upper end of a fourth leg of said four legs into one of the rigid sleeves near said one end and removing said third leg from said fifth sleeve, thereby supporting said beam with said first, second and fourth legs, and e) inserting an upper end of said third leg into the remaining rigid sleeve to support said beam above said surface with said four legs.

4. A process of erecting load bearing equipment comprising:

a) elevating a first end of a load support beam above a supporting surface while a spaced second end of the beam rests on the surface;

b) connecting a first pair of legs to the beam near the first end to support the first end in its elevated position;

c) hingedly connecting an elongated element to the second end of the beam and elevating the beam second end by rotating the element relative to the beam about a hinge axis;

d) securing a further leg to the beam near said second end and removing the element such that the beam is supported by the pair of legs and the further leg; and, e) connecting a still further leg to the beam near the second end such that the beam is supported by four legs each with a surface engaging end remote from the beam and spaced from each of the other surface engaging ends.

5. The process of claim 4 further including temporarily supporting the beam with a strut hingedly connected to the beam with the second end of the beam at an elevation intermediate its positions of steps (a) and (b).

6. The process of claim 5 further including the step of connecting a free end of the strut to said further and said still further legs and thereby provide reinforcement resisting longitudinal beam movement.

7. The process of claim 6 further including the step of fixing opposite ends of a brace to the further and still further legs and connecting the free end of the strut to the brace.

8. The process of claim 4 further including connecting opposite ends of a brace to a selected two of the legs.

9. The process of claim 4 wherein the elongate element is also said still further leg.

10. A process of erecting load bearing equipment:

elevating a first end of a longitudinally extending beam above a supporting surface while an opposite second end of the beam rests on the surface;

the beam including four rigid sleeves arranged in fixed positions in two pairs, the pairs being in spaced relationship with one another near the opposite ends of said beam, each of said four rigid sleeves sloping downwardly and transversely outward of said beam when the equipment is in use;

connecting two of four legs each with an associated one of said rigid sleeves near a first end of the beam to thereby support one end of said beam above a surface in an erected state;

connecting a third one of the legs to a fifth sleeve hingedly mounted near the second end of said beam, the fifth sleeve sloping downwardly of said beam when the equipment is in use;

rotating the fifth sleeve into engagement with a stop means on said beam for limiting hinging movement of said fifth sleeve thereby elevating the second end of the beam;

connecting an upper end of the fourth one of said legs into one of said respective rigid sleeves adjacent said fifth sleeve, when the third leg is engaged in said fifth sleeve and said third leg and said fifth sleeve have rotated about said hinge to elevate the beam second end to a substantially vertical position to temporarily support and raise said beam second end above the support surface and connecting said third leg to a fourth of the rigid sleeves.

11. The process of claim 10 wherein said beam is square in cross-section.

12. The process of claim 11 wherein said beam is tubular.

13. The process of claim 10 further comprising a brace member for fitment of respective ends of said brace member to said one and another of the legs intermediate their ends to form a substantially horizontal member to brace said one and said another legs.

14. The process of claim 13 wherein said brace member is hinged near one and to a selected first of said one and said another leg and a free end of said brace includes a fastening means for fastening to an intermediate position along the length of a second of said one and said another legs to brace said legs.

15. The process of claim 13 further comprising a strut hinged to said beam near the end of the beam having said fifth sleeve with the strut having a free end wherein said strut is of length such that said free end may locate on said support surface to support an end of said beam during the erection or disassembly of said equipment.

16. The process of claim 10 further comprising screw threaded locking clamps located in said sleeves for clamping a said leg into a said sleeve.

17. The process of claim 10 wherein each said leg comprises two parts including a spigot and socket connection between said parts, thereby providing an alternate height of said beam above said surface when said load bearing equipment is erected.

18. The process of claim 10 further comprising a base plate located at an end of said beam of size and shape for supporting a workpiece clamp.

19. A process of erecting load bearing equipment:

elevating a first end of a longitudinally extending beam above a supporting surface while an opposite second and of the beam rests on the surface, the beam including four rigid sleeves arranged in two spaced pairs respectively near the opposite ends of said beam, each of said rigid sleeves sloping downwardly and transversely outward of said beam when the equipment is in use;

connecting two of four legs each in an associated one of said sleeves to thereby support said beam above a surface in an erected state when each of said four legs are in place;

connecting a third one of the legs to a fifth sleeve at one end of said beam secured to the beam by a hinge having a transverse axis hinging said fifth sleeve to said beam, limiting relative movement of the fifth sleeve and beam about a hinge axis by engaging a stop means on said beam for limiting upward hinging movement of said fifth sleeve and the third leg to substantial alignment with the longitudinal axis of said beam as the equipment is being erected, erecting the beam by rotating the third leg and the fifth sleeve about the hinge axis and during erection inserting an upper end of the fourth one of said legs, in one of said respective rigid sleeves adjacent said fifth sleeve after said one leg and said fifth sleeve are rotated about said hinge axis to a substantially vertical position to temporarily support and raise said beam end above a support surface, and transferring said third leg from said fifth sleeve to said another rigid sleeve adjacent said fifth sleeve whereupon said load bearing equipment is in its erected state.

20. The process of claim 19 wherein said beam is square in cross-section.

21. The process of claim 20 wherein said beam is tubular.

22. The process of claim 19 further comprising using a brace member between two of the legs intermediate their ends to form a substantially horizontal member to brace said one and said another legs.

23. The process of claim 22 wherein said brace member is hinged to a selected first of said two legs and a free end of said brace includes a fastening means for fastening to an intermediate position along the length of a second of said two legs to brace said two legs.

24. The process of claim 22 wherein a strut is hinged to said beam near the end of the beam having said fifth sleeve with the strut having a free end wherein said strut is of length such that said free end may locate on said support surface to support an end of said beam during the erection or disassembly of said equipment.

25. The process of claim 19 further comprising tightening a screw threaded locking clamp located in one said sleeves to clamp a said leg into said one said sleeve.

26. The process of claim 19 wherein each said leg comprises two parts including a spigot and socket further including selectively connecting said parts, thereby providing an alternate height of said beam above said surface when said load bearing equipment is erected.

27. The process of claim 19 further comprising providing a base plate located at an end of said beam of size and shape for supporting a workpiece clamp.

* * * * *